Nov. 19, 1968  E. A. MEYER  3,411,262

ADAPTOR AND MOLDING ASSEMBLY

Filed Sept. 7, 1966  4 Sheets-Sheet 1

INVENTOR
ENGELBERT A. MEYER
BY
Burton & Parker
ATTORNEYS

INVENTOR
ENGELBERT A. MEYER
BY
*Burton & Parker*
ATTORNEYS

Nov. 19, 1968   E. A. MEYER   3,411,262
ADAPTOR AND MOLDING ASSEMBLY
Filed Sept. 7, 1966   4 Sheets-Sheet 3

INVENTOR
ENGELBERT A. MEYER
BY
*Burton & Parker*
ATTORNEYS

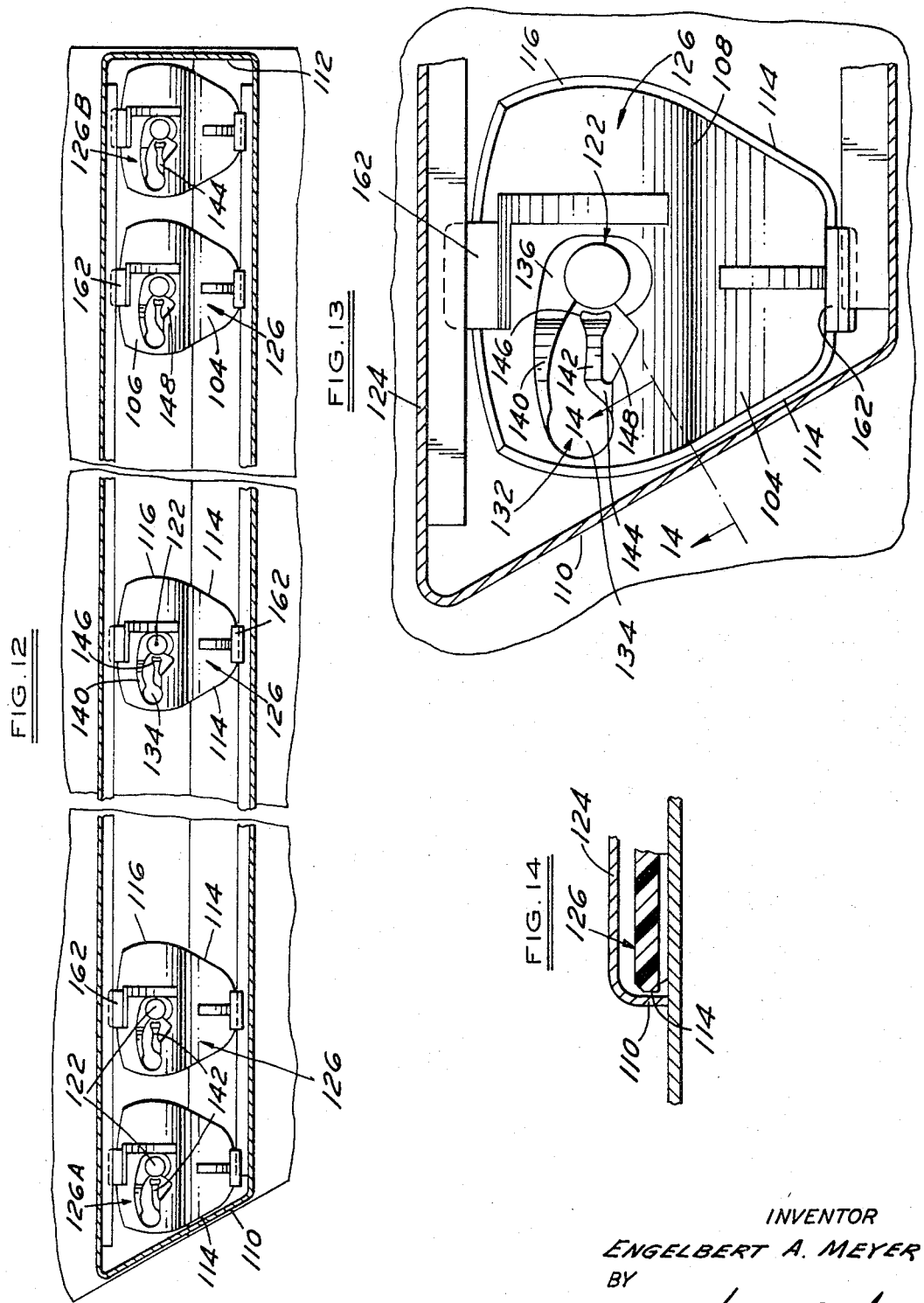

United States Patent Office 3,411,262
Patented Nov. 19, 1968

3,411,262
ADAPTOR AND MOLDING ASSEMBLY
Engelbert A. Meyer, Union Lake, Mich., assignor to Warren Fastener Corporation, Mount Clemens, Mich., a corporation of Michigan
Filed Sept. 7, 1966, Ser. No. 577,712
13 Claims. (Cl. 52—718)

ABSTRACT OF THE DISCLOSURE

This disclosure relates to a molding assembly including a support having a headed button secured thereto, a longitudinal molding device, and an adaptor interconnecting the molding device to the support. The adaptor has a key hole slot which receives the button, and a locking means including an arm resiliently joined to the body portion of the adaptor within the key hole slot, having an axis generally coincident with the axis of the button seat opposite the enlarged opening of the key hole slot, and a finger opposite the button seat. The finger includes a lip which is received beneath the button head, and the slot, opposite the arm of the locking means, is arcuate to bias the arm out of restrictive engagement during attachment. In the molding assembly, a plurality of spaced adaptors are secured to the support with the locking arms parallel to the axis of the molding device to prevent lateral shifting thereof, and the edge of the adaptor is tapered to accommodate a molding device having a tapered end. One embodiment of the disclosed adaptors includes a pair of angularly related body portions adapted to overlie angularly related support surfaces. In this embodiment, the axis of the key hole slot is generally parallel to the junction of the angularly related body portions of the adaptor to permit shifting of the adaptor parallel to the junction during attachment.

---

Molding devices are used in the manufacture of automobiles, refrigerators and the like to meet functional and design requirements.

Preferably, the button is attached to the support in accordance with the method described in my United States Letters Patent No. 3,153,468, wherein the button is welded to steel or adhesively secured to various materials including steel, thereby eliminating the corrosion problems inherent in previously used techniques requiring a hole through the support. Another advantage is the substantial reduction in storage requirements made possible by the weld on system. Separate inventory of common body panels and the like, necessitated by the use of different trim, may be eliminated because the buttons are welded on in the assembly line. A series of spaced buttons for a single longitudinal molding device may be applied in a gang operation with accurate alignment.

The button of the weld on system is small when compared to previously employed fasteners in the automotive field. A suitable size button, presently used in automotive manufacture, involves a button which is 0.200 inch in diameter at its head, 0.160 inch in height; the shank of the button being slightly greater than one half the diameter of the head. Utilization of the weld on fastener system in the automotive field provides substantial economies and advantages over previous methods. Similar economies and advantages are obtained in other fields, such as appliances, refrigerators, stoves and the like.

The instant application will be described in the context of an automotive molding assembly.

The improved adapter of this invention was designed to meet a particular design requirement; the provision of an adaptor which is easily connected to or removed from the weld on fastener system button, but which will not loosen, or be accidentally removed from the button under the severe conditions normally encountered in automotive applications. According to one embodiment of my invention, the improved adaptor is designed to overlie a pair of angularly related support surfaces.

A problem in the design of an adaptor which meets these requirements results from the fact that the button of the weld on fastener assembly is attached prior to the adaptor and the trim, and the relatively small button, which may be characterized as B-B shot size.

The disclosed embodiment of the key hole slot effectively eliminates shifting of the adaptor under shock or vibrational forces, yet can be easily removed without damage to the adaptor. When combined with the accuracy of alignment of the weld on fastener system, this embodiment opens new fields of safety in automotive molding attachment.

The improved adaptor according to one embodiment of this invention, has a key hole slot with an arm resiliently joined to the body portion of the adaptor within the key hole slot. The arm extends toward a button seat defined at the end of the key hole slot opposite the enlarged opening, and terminates in a finger opposite the button seat which inhibits withdrawal of the button from the seat. The axis of the arm substantially coincides with the horizontal axis of a button received on the button seat, and thereby effectively prevents removal of the button from the seat with a small resilient arm.

The key hole slot is preferably arcuate to facilitate seating of the button past the arm, and the adaptor is provided with a channel adjacent the arm, opposite the arcuate slot, adapted to receive the finger as the button is urged past the finger in the arcuate slot. The end of the finger opposite the button seat may also be arcuate to conform to the cylindrical cross section of a weld on fastener system button, and may be provided with a lip which is received beneath the enlarged head of the button to prevent withdrawal of the button beneath the finger.

Utilization of this configuration of the key hole slot, with the accuracy of alignment made possible by the weld on fastener system, permits the placement of adaptors adjacent the molding ends, where loosening stresses are concentrated. The ends of an automobile molding extend toward the body panel, and the adaptor of this embodiment may be accurately positioned within the molding ends, to prevent axial shifting of the molding. The resilient arm of the adaptor, in contact with the button and positioned in the axis of withdrawal, prevents shifting of the adaptor, and provides firm securement of the molding.

My experience has shown that an automotive molding, generally, first loosens adjacent its ends, and where the molding is firmly secured at the ends, as is possible with the molding assembly of this invention, the molding is less likely to loosen. Previous molding fastener techniques, requiring a hole through the support, did not permit accurate positioning of the adapter or molding clip adjacent the molding ends to prevent axial shifting of the molding. In the previously disclosed molding assemblies, the adaptor was not designed to withstand severe shock loading in the axis of the molding. In the molding assembly of this invention, however, the adaptor may be positioned immediately adjacent the molding ends, because the buttons may be accurately aligned during assembly, and because the arms of the adaptor is positioned to retain the adaptor to the button under shock load conditions. The adaptor of this embodiment may be positioned within 0.060 inch or less of the molding ends to provide greater safety of securement than previous known techniques, and the end of the adaptor may be configured to accommodate tapered molding ends, such as found in automotive door moldings, as discolosed herein.

The slot has a ramp opposite the arm to bias the adaptor toward the support as the button is seated on the button seal. The adaptor is easily removed from the button by biasing the resilient arm into the channel with a tool or by hand, and by shifting the adaptor to unseat the button.

According to one embodiment of this invention, the adaptor is provided with a pair of angularly related body portions adapted to overlie and lay substantially in the plane of a pair of complimentary angularly related surfaces of the support. The axis of the key hole slot in this embodiment is generally parallel to the junction of the angularly related body portions, to permit seating of the adaptor by shifting the adaptor in an axis substantially parallel to the junction of the angularly related surfaces of the support. The angularly related body portions may be provided with fins which extend between the support and the molding device to insulate the molding from the support. The fins in this embodiment extend substantially perpendicular to the axis of the key hole slot.

The adaptor may be provided with a pilot which eliminates the need of accurately aligning the adaptor prior to application of the molding device. The pilot is engaged by the inturned flanges of the molding device, which cams the adaptor into the final alignment position. The pilot of the adaptor can be formed to correct a misalignment of about 45 degrees; the pressing application of the molding device causes the desired predetermined final alignment of the adaptor for final locking of the molding device.

Other objects, advantages and meritorious features will more fully appear from the following specification, claims and accompanying drawings, wherein:

FIGURE 12 is a partial, cross sectioned, top elevation of a molding assembly illustrating the position of the adaptors;

FIGURE 13 is an enlarged cross sectioned view of a portion of FIGURE 12; and

FIGURE 14 is a cross sectioned side view of FIGURE 13, in the direction of view arrows 14—14.

Figure 1:
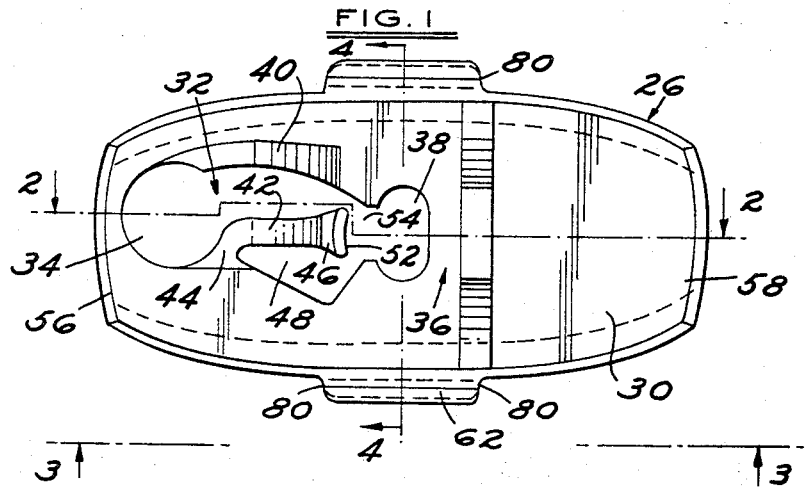
FIGURE 1 is a top elevation of one embodiment of the adaptor of this invention.
Figure 2:
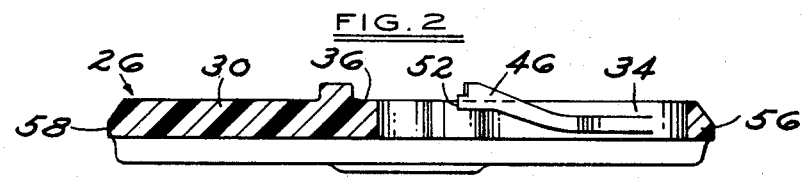
FIGURE 2 is a cross sectional view of the adaptor shown in FIGURE 1 in the direction of view arrows 2—2.
Figure 3:
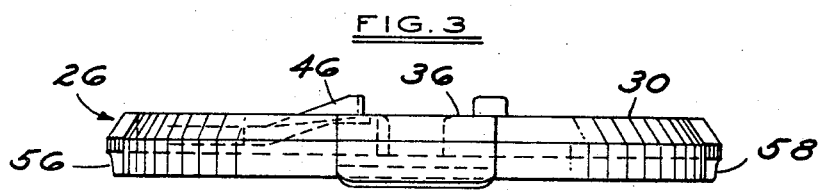
FIGURE 3 is a side elevation of the adaptor shown in FIGURE 1 in the direction of view arrows 3—3.
Figure 4:
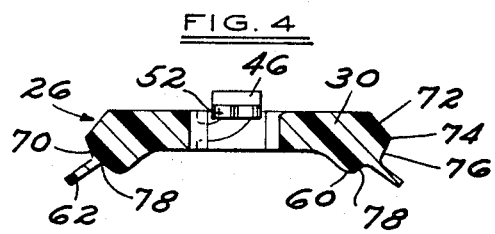
FIGURE 4 is a cross sectional view of the adaptor shown in FIGURE 1 in the direction of view arrows 4—4.

FIGURES 1 to 7 illustrate one embodiment of the adaptor and molding assembly of this invention. The molding assembly, shown in FIGURES 6 and 7, comprises a support 20 having a button 22 attached thereto, a hollow molding device 24, and an adaptor 26 interconnecting the molding device to the support in overlying relation. The support may be an automotive body panel, refrigerator housing, or the like. The button has an enlarged head 28 spaced from the plane of the support, and may be welded or adhesively bonded to the support in accordance with my above referenced United States Letters Patent.

The adaptor 26 has a body portion 30 with a key hole slot 32 defined therein. The key hole slot has an enlarged opening 34 at one end, and terminates in a button seat 36 at the opposite end. The key hole slot adjacent the button seat, in this embodiment of my adaptor, has a transverse slot 38, which will accommodate misalignment of a button in the series of buttons required for a longitudinal molding device. The body portion has a ramp 40 adjacent the key hole slot which biases the adaptor toward the support as the adaptor is shifted to seat a button on the button seat 36.

An arm 42 is resiliently joined to the body portion of the adaptor, at 44, adjacent the enlarged key hole opening 34. The axis of the arm 42 in this embodiment is coincident with the axis of the button seat 36, as shown in FIGURE 1, and therefore will substantially coincide with the horizontal axis of a button received on the button seat. The arm terminates in a finger 46 opposite the button seat 36. The finger is designed to inhibit removal of a button from the button seat, however the finger is easily urged out of its restricted position into a channel 48 in the adaptor body, which is configured to receive the finger.

Figure 5:
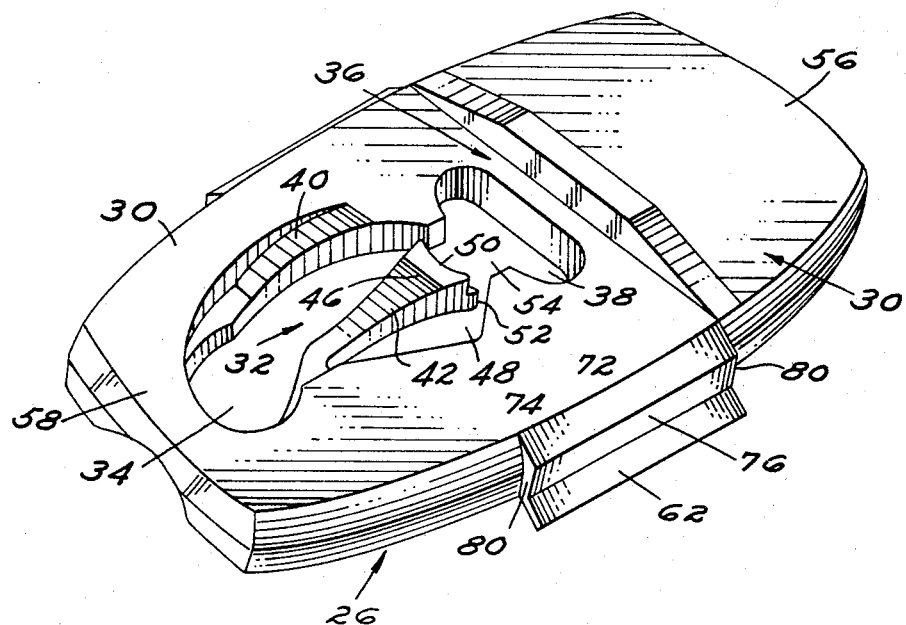
FIGURE 5 is a perspective view of the adaptor shown in FIGURE 1.

The end of the finger 50, see FIGURE 5 opposite the button seat 36, may be arcuate to conform to the cylindrical cross section of the button head 28, to aid in the retention of a button. The end of the finger may also be provided with an underlying lip 52, which is received beneath the button head, see FIGURE 7, to prevent a button from being withdrawn beneath the finger.

As described hereinabove, the arm 42, and therefore the finger 46, lie in the axis of the button seat 36, and it can be seen from FIGURES 1 and 5 that the slot is narrowed at 54 adjacent transverse slot 38. The finger will therefore effectively prevent accidental removal of a button on the button seat. For example, if the arm were disposed at an angle to the axis of the button seat, the arm could be biased out of position under the forces encountered in automotive applications. However, the force of removal in this embodiment will be transmitted in the axis of the arm, and therefore will not tend to bias the arm out of position.

The adaptor is connected to the button by disposing the adaptor opening 34 over the button head, and shifting the adaptor to urge the button head up the inclined ramp 40, past the finger 46, onto the button seat. In this embodiment, the slot defines an arc above the finger, to facilitate camming of the finger toward the body channel 48; to allow the button to be shifted past the finger onto the button seat.

The adaptor of this embodiment need not be accurately aligned prior to application of the molding device, and because it is symmetrical about the axis of the button, the adaptor may be oriented in either position with the axis of the adaptor in the axis of the molding device. The symmetry of the adaptor is important in a door molding, for example, where the access to the button is limited. The width of the adaptor is reduced adjacent either end, 56 and 58, to function as a pilot in the attachment of the molding device to the adaptor. The pilots align the adaptor into the final attachment position as it is received in the molding device, as described more fully in my United States Letters Patent 3,239,988.

Figure 6:
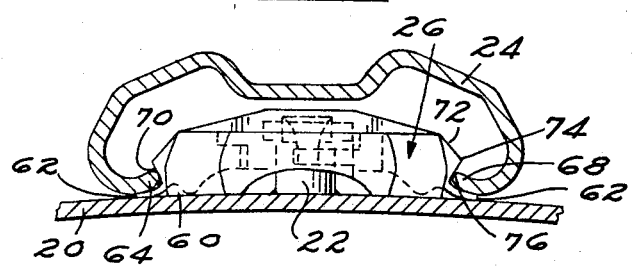
FIGURE 6 is an end view of the molding assembly, and employes the adaptor shown in FIGURE 1.
Figure 7:
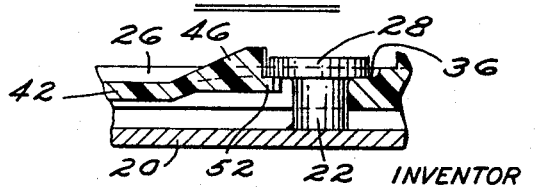
FIGURE 7 is a partial cross sectional view of the connection between the adaptor and the button shown in FIGURE 6.

The base of the adaptor is provided with a pair of longitudinally extending bases 60, see FIGURE 6, which provide a frictional face to face engagement of the adaptor with the support when the adaptor is biased toward the support. This engagement prevents detachment of the adaptor under vibration and other forces. The body of the adaptor is provided with a pair of downwardly extending fins 62 which are biased against the support to extend substantially co-planer with the bases, between the inturned flanges 64 and 68 of the molding device and the support 20. The fins serve as insulation against electrolytic corrosion between the molding device and the support.

The configuration of the molding device is considered optional, and will depend upon its design and functional requirements. On installation, one of the flanges 64 may be moved into the longitudinal groove 70 on the side of the body portion 30. The other inturned flange 68 of the molding device is then placed against the tapered side 72 of the body to expand the molding device. The flange 68 may then be moved past the vertical side wall 74, and will spring into the groove 76 on the opposite side of the body. In the assembled position, the tapered walls 70 and 76 of the adaptor extend or overlie the inturned flanges of the molding device to inhibit removal of the molding. It will be noted that the fins 62 space the molding device from the automotive support, therefore allowing intercirculation of air under the molding device in the portions between the adaptors to evaporate moisture and inhibit corrosion problems.

Critical manufacturing and assembly tolerances are met by the adaptor body design. The longitudinal bases 60 are relieved by channels 78, see FIGURE 4, at the junction of the fins 62 with the body 30, to eliminate any effect of the bias of the fins on the maintenance of the bases 54 in face to face dimension controlling contact with the support 20. Top to bottom transverse cut-out portions 80, between the body portion 30 and the pilot or nose portions 56 and 58, are also provided for this purpose.

FIGURES 8 to 11 illustrate another embodiment of the molding device and adaptor of this invention. The adaptor in the embodiment is similar in construction to the adaptor shown in FIGURES 1 to 7, except that it is designed to connect a molding assembly to a panel having angularly related surfaces 100 and 102, see FIGURE 10, and the adaptor is designed to be secured to the support, adjacent the ends of a hollow longitudinal molding, to prevent axial shifting thereof, see FIGURES 12 to 14. The adaptor is provided with a pair of angularly related body portions, 104 and 106, which overlie and lay substantially in the plane of the angularly related support surfaces.

Figure 8:
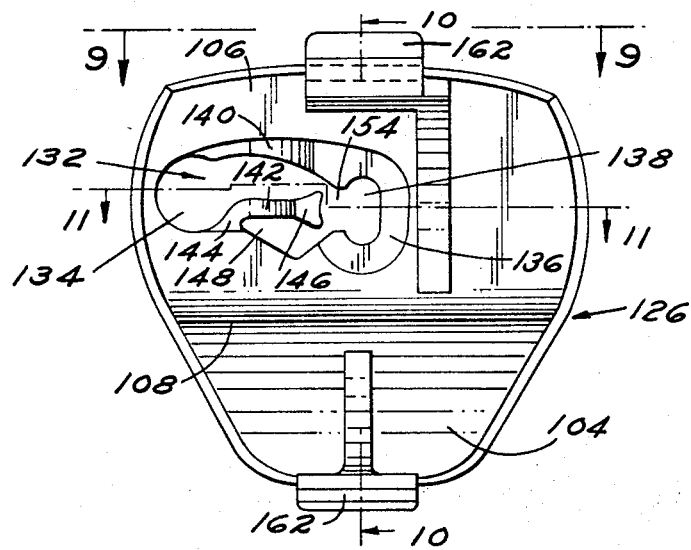
FIGURE 8 is a top elevation of another embodiment of the adaptor of this invention.
Figure 9:
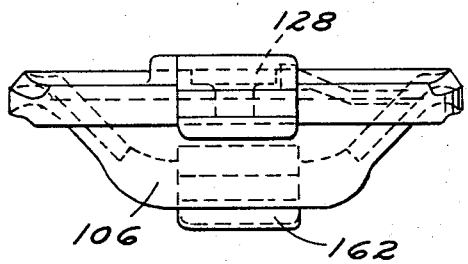
FIGURE 9 is a side view of the adaptor shown in FIGURE 8 in the direction of view arrows 9—9.
Figure 10:
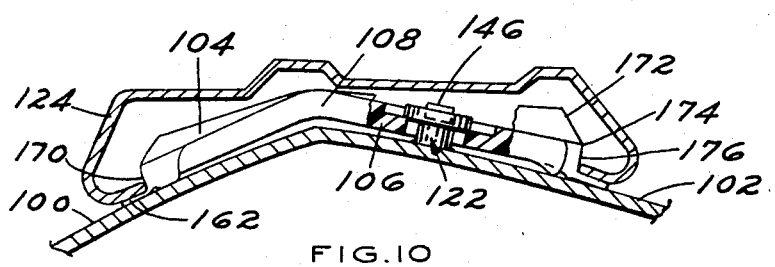
FIGURE 10 is a side view, partially cross sectioned, of a molding assembly utilizing the adaptor shown in FIGURE 8.
Figure 11:
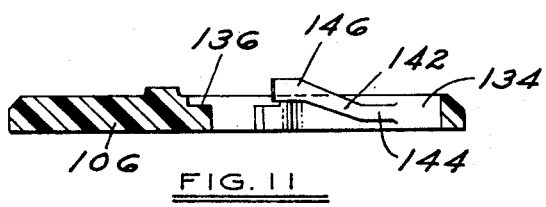
FIGURE 11 is a cross sectional view of the adaptor shown in FIGURE 8 in the direction of view arrows 11—11.

It can be seen from FIGURE 8, that the axis of the key hole slot 132 is generally parallel to the junction 108 of the body portions, which allows the adaptor to be attached to the button 122 by shifting the adaptor substantially in the axis of the junction of the body portions 108.

The finger 146 in this embodiment does not have an underlying lip, similar to the lip 52 in FIGURES 1 to 7, however the key hole slot construction is similar and has been numbered accordingly. Another distinction in this embodiment is the elimination of the "pilot" surfaces 56 and 58, shown in FIGURES 1 to 7 and described hereinabove. This embodiment of the adaptor is self-aligning with the support, and therefore does not require pilot surfaces. Other features not described herein are similar to the structures described hereinabove, and have been numbered accordingly.

FIGURES 12 to 14 illustrate one embodiment of the molding assembly of this invention, wherein the adaptors are positioned to prevent axial shifting of the molding. The adaptors 126, and the molding assembly, may be identical to the embodiment shown in FIGURES 8 to 11, and have been similarly numbered. It can be seen from FIGURES 12 to 14 that the hollow longitudinal molding 124, of this embodiment, is provided with one pair of opposed downwardly extending end flanges 110 and 112, and an adaptor 126A and 126B is positioned within the molding immediately adjacent each end. As disclosed hereinabove, the arms 142 of the adaptors restrict withdrawal of the adaptors from the bottoms 122 because the arm and the finger 146 lie substantially in the axis of the button seat. But more important to this embodiment of the assembly, the adaptor arms extend generally parallel to the axis of the longitudinal molding, to prevent shifting of the adaptors upon axial shifting of the molding against the adaptors. A pair of adaptors, as shown in FIGURE 12, may be positioned adjacent each end, to provide added safety of securement of the longitudinal molding. The adaptors 126A and 126B, adjacent the ends, may be positioned within 0.060 inch or less of the molding ends, to securely position the hollow molding channel on the support surface.

The adaptor of this embodiment of my invention is configured to retain tapered molding ends, as shown at 110 in FIGURES 12 and 13. The sides 114 of the adaptor are tapered toward the axis of the button seat to accommodate a tapered molding end, and the curved side portions 116 prevents axial shifting of a rectangular molding end, such as 112 of FIGURE 12. It can be seen from FIGURES 12 and 13, that the adaptor is symmetrical about the vertical axis of the button seat, so that the adaptor of this embodiment will accommodate a molding having a tapered end opposition to the taper 110 shown in FIGURE 13. Thus, the same adaptor configuration may be utilized on the opposite side of the car body, without requiring a specially designed adaptor for the opposed molding. Further, the adaptor of this embodiment will accommodate various molding end angles, without further modification.

This embodiment of the molding assembly provides safety of securement not present in previously known fastener techniques, yet may be easily and accurately assembled without special training. The molding is secured against axial shifting, even under shock loading, and the ends of the molding are firmly secured to the support to prevent loosening of the molding under vibration, or other forces.

Various materials may be used for all parts of the molding assembly, however the automotive industry utilizes metal primarily for the automotive support and for the molding device. Steel is used primarily for the molding support, with stainless steel being used for the button, as well as cold-rolled zinc plated steel. The buttons are stud welded to a prefabricated automotive support, before painting, or at least before final finishing, in a predetermined orientation. After cleaning, coating, and polishing, the automotive support is ready to receive the adaptor. Preferably, the adaptor is made of a non-metallic relatively resilient material to provide the electrolytic corrosion barrier between the dissimilar metal parts, and to provide the resiliency required for assembly. A suitable material for the adaptor is a thermo-plastic resin, such as fiber filled nylon, polycarbonates, acetal resins, and polypropylene.

While the molding assembly, adaptor, and button have been described with reference to certain configurations and arrangement of elements, it is understood by those skilled in the art that various modifications may be made to the embodiments disclosed without departing from the purview of the appended claims or the invention as disclosed herein. For example, a different key hole slot could be used in the embodiment shown in FIGURES 8 to 11, provided that the axis of the key hole slot is generally parallel to the junction of the angularly related surfaces. Further, various structural reinforcements have been illustrated in the adaptor embodiments however these are considered matters of choice and design, as their position and configuration will depend on the environment and adaptor body configuration. Other weld on button designs may also be utilized, which may require specially configured button seats.

What is claimed is:

1. An adaptor for attaching a hollow molding device to a support having an outer surface with a button secured thereto, said button having an enlarged head spaced from the plane of the support, comprising:

a body portion having a key hole slot defined therein terminating in a button seat opposite the enlarged opening of said key hole slot, a single locking means including an arm extending toward said button seat resiliently joined to said body portion within said key hole slot, said arm terminating in a finger opposite said button seat, the axis of said arm generally coincident with the axis of said button seat to inhibit withdrawal of a button received on said button seat.

2. The adapter defined in claim 1, characterized in that the end of said finger adjacent said button seat has a lip portion adapted to be received beneath the enlarged head of a button seated on said button seat to prevent the button from being withdrawn beneath said finger.

3. The adaptor defined in claim 1, characterized in that said body portion includes a pair of angularly related planer portions whose junction is generally parallel to the axis of said key hole slot.

4. The adaptor defined in claim 1, characterized in that the slot portion of said key hole slot defines an arc about said arm to facilitate the resilient biasing of said finger out of the path of a button received in said slot portion to be seated on said button seat.

5. A molding assembly, comprising:
a support having an outer surface with a bottom secured thereto, said bottom having an enlarged head spaced from the plane of said support, a hollow molding device, and an adapter connected to said bottom and to said molding device serving to interconnect the molding device to said support in overlying relation, said adaptor having a key hole slot defined therein terminating in a button seat opposite the enlarged opening of said key hole slot, a single locking means including an arm extending towards said button seat resiliently joined to said adaptor within said key hole slot, said arm terminating in a finger inhibiting withdrawal of the button received on said button seat, the axis of said arm being substantially coincident with the axis of said button when received on said button seat requiring lateral shifting of said locking means to remove the adapter from said button.

6. The molding assembly defined in claim 5, characterized in that the end of said finger adjacent said button seat is arcuate to conform to the cylindrical cross section of said button.

7. The molding assembly defined in claim 5, characterized in that the end of said finger adjacent said button seat has an underlying lip portion received beneath said enlarged head of said button to prevent the button from being withdrawn beneath the finger.

8. A molding assembly, comprising: a support having a series of linearly aligned buttons secured in spacing relation thereto and extending from the surface thereof, a series of identical adaptors each secured to one of said buttons and tensioned towards said support, and a longitudinal hollow molding secured adjacent its lateral edges to said adaptors in overlying relation thereto, said hollow longitudinal molding having end portions extending towards said support, and one of said adaptors positioned within said hollow molding immediately adjacent each of said molding ends to prevent axial shifting of said molding, said adaptors each having a key hole slot terminating in a button seat opposite the enlarged opening of said key hole slot and an arm extending towards said button seat joined to said adaptor within said key hole slot, substantially parallel to the axis of said longitudinal molding and the axis of said arm generally coincident with the axis of said button seat.

9. The molding assembly defined in claim 8, characterized in that one of said molding ends is tapered with respect to the axis of said longitudinal molding, and the end of said adaptors opposite said one of said molding ends configured to compliment said tapered molding end to prevent axial shifting thereof.

10. The molding assembly defined in claim 8, characterized in that said series of adaptors are positioned with a pair of linearly aligned adaptors adjacent each said end of said molding, with the remainder of said adaptors spaced therebetween.

11. The molding assembly defined in claim 8, characterized in that said support has a pair of angularly related surfaces, and said adaptors have a pair of complimentary angularly related body portions closely overlying said support surfaces, and said key hole slots defined substantially parallel to the axis of the junction of said angularly related body portions of the adaptors.

12. The adaptor defined in claim 1, characterized in that the edge of said slot opposite said arm of the locking means has an inclined ramp adapted to bias said adaptor toward the support as the button head is received on said inclined ramp.

13. The adaptor defined in claim 4, characterized in that the arcuate edge of said key hole slot opposite said arm of the locking means includes an inclined ramp adapted to bias said adaptor toward the support as the button head is received on said ramp.

References Cited
UNITED STATES PATENTS

| | | | |
|---|---|---|---|
| 2,788,100 | 4/1957 | Landell | 52—718 |
| 3,138,225 | 6/1964 | Jansson | 52—718 |
| 3,188,730 | 6/1965 | Meyer. | |
| 3,239,988 | 3/1966 | Meyer | 52—718 |

FRANCIS K. ZUGEL, *Primary Examiner.*